(12) United States Patent
Tertzakian et al.

(10) Patent No.: US 11,822,468 B2
(45) Date of Patent: Nov. 21, 2023

(54) EXECUTABLE CODE BRANCH ANNOTATIONS FOR OBJECTIVE BRANCH VERIFICATION

(71) Applicant: Microsoft Technology Licensing, LLC, Redmond, WA (US)

(72) Inventors: Augustus Tertzakian, Kirkland, WA (US); Rajesh Gururaj, Redmond, WA (US); Sergii Liashenko, Edmonds, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 16/422,631

(22) Filed: May 24, 2019

(65) Prior Publication Data

US 2020/0371906 A1    Nov. 26, 2020

(51) Int. Cl.
*G06F 11/36* (2006.01)
(52) U.S. Cl.
CPC ...... *G06F 11/3692* (2013.01); *G06F 11/3612* (2013.01); *G06F 11/3636* (2013.01); *G06F 11/3688* (2013.01)
(58) Field of Classification Search
None
See application file for complete search history.

(56) References Cited

U.S. PATENT DOCUMENTS

| 5,450,586 | A | 9/1995 | Kuzara et al. |
| 6,311,327 | B1 * | 10/2001 | O'Brien ............ G06F 11/3466 714/35 |
| 6,714,883 | B1 | 3/2004 | Samuels |
| 7,058,928 | B2 | 6/2006 | Wygodny et al. |

(Continued)

FOREIGN PATENT DOCUMENTS

| GB | 2571947 A | 9/2019 |
| JP | H02181241 A | 7/1990 |
| JP | H03204044 A | 9/1991 |

OTHER PUBLICATIONS

Pavlinovic, et al., "Inferring Annotations for Device Drivers from Verification Histories", In Proceedings of the 31st IEEE/ACM International Conference on Automated Software Engineering, Sep. 3, 2016, pp. 450-460.

(Continued)

*Primary Examiner* — Jason D Mitchell
(74) *Attorney, Agent, or Firm* — Holzer Patel Drennan (57) ABSTRACT

A method for objective code branch verification executes code branch annotations to assess developer-specified pass conditions for each code branch that are indicative of whether or not the code branch is functioning as originally intended by the author of the code. The method includes maintaining and dynamically updating both a counter value and a pass indicator status in association with each of multiple annotated code branches defined within a code body during execution of the code body. The counter value for each annotated code branch represents a number of times the annotated code branch has executed within a current run-time environment, and the pass indicator status indicates satisfaction or non-satisfaction of a pass condition identified within the code branch that is determined based on the counter value for the associated code branch.

17 Claims, 5 Drawing Sheets

(56) References Cited

U.S. PATENT DOCUMENTS

| | | | |
|---|---|---|---|
| 7,353,500 B2* | 4/2008 | Loku | G06F 11/3676 |
| | | | 712/227 |
| 8,776,026 B2 | 7/2014 | Candea et al. | |
| 9,733,910 B2 | 8/2017 | Balasubramanian et al. | |
| 2005/0155026 A1 | 7/2005 | Dewitt et al. | |
| 2006/0259830 A1* | 11/2006 | Blevin | G06F 11/3476 |
| | | | 714/45 |
| 2011/0047532 A1* | 2/2011 | Wang | G06F 11/3676 |
| | | | 717/130 |
| 2012/0079460 A1* | 3/2012 | Cho | G06F 11/3624 |
| | | | 717/130 |
| 2012/0124560 A1* | 5/2012 | Indukuru | G06F 11/3471 |
| | | | 717/127 |
| 2012/0311540 A1* | 12/2012 | Fanning | G06F 11/3612 |
| | | | 717/127 |
| 2014/0075418 A1* | 3/2014 | Bates | G06F 11/3624 |
| | | | 717/129 |
| 2014/0281392 A1* | 9/2014 | Tuck | G06F 11/3466 |
| | | | 712/208 |
| 2014/0281424 A1 | 9/2014 | Bobba et al. | |
| 2017/0083319 A1* | 3/2017 | Burger | G06F 9/3836 |
| 2017/0083430 A1* | 3/2017 | Meerovich | G06F 8/00 |
| 2019/0266074 A1* | 8/2019 | Copty | G06F 11/3684 |
| 2020/0125485 A1* | 4/2020 | Wiener | G06F 8/71 |

OTHER PUBLICATIONS

Korel, et al., "Assertion-Oriented Automated Test Data Generation", In Proceedings of IEEE 18th International Conference on Software Engineering, Mar. 25, 1996, pp. 71-80.

"International Search Report & Written Opinion Issued in PCT Application No. PCT/US20/028377", dated Jul. 10, 2020, 9 Pages.

"Notice of Allowance Issued in European Patent Application No. 20724314.8", dated Sep. 11, 2023, 8 Pages.

* cited by examiner

EXECUTABLE CODE BRANCH ANNOTATIONS FOR OBJECTIVE BRANCH VERIFICATION

BACKGROUND

Software testing is typically planned by a developer implementing a manually-devised test plan intended to check that each code branch in a code body executes as intended under the intended branch-trigger conditions. Devising an accurate and comprehensive test plan can be onerous and costly due to the vast number of situations that a particular software product, such as a device driver, may experience in the field. These manually-devised test plans are often imperfect and, as a result, fail to adequately test all code branches that can possibly execute. This difficulty often results in a software product released for use that executes code branches incorrectly, yet in such a way that it is not detected by an end-user. In turn, such usage can lead, in some cases, to an accumulation of errors that eventually result in serious system error long after the initial incorrect execution of code branches occurred.

SUMMARY

A tool for objective code branch verification maintains a counter value and a pass indicator status in association with each of multiple code branches defined within a code body. The counter value for each code branch represents a number of times the code branch has executed within a current run-time environment, and the pass indicator status indicates whether the current counter value for the code branch satisfies a pass condition identified within an annotation of the code branch. During execution of the code body, the annotations in the code branches execute to evaluate the associated pass conditions. Responsive to each evaluation of a pass condition, the tool dynamically updates the pass indicator status for the associated code branch based on the evaluation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Some existing software test products utilize techniques commonly referred to as "code coverage" to provide a developer with measurements indicating which statements in a body of code have been executed (e.g., when and how many times each line of code has executed) and which lines of code have not been executed. Code coverage products are particularly useful in helping a developer verify what percent of the code has executed. Code coverage is granular to the line of code level and does not consider the larger groups of lines of code that make up the functional requirements of the software. A common problem in code testing occurs when a person testing a body of code may not always be aware of whether or not a code branch is supposed to execute during nominal execution. For example, a developer may draft a code branch that is not supposed to execute unless the system encounters a rare error. Over time, a developer may forget the purpose and/or function of a particular code branch and become uncertain of when the code branch is supposed to execute.

Likewise, a software product may be changed many times and these changes may, in time, cause a particular code branch to execute less often, more often, or never or in some other unexpected fashion. A tester implementing a variation of the software product may have no idea that these changes have occurred. Similarly, code authors (both original and new) may not understand why certain code branches exist and/or if it is safe to remove code branches that appear obsolete and unnecessary.

Current code testing solutions, such as those employing code coverage techniques, provide a tester with information regarding when and how many times certain lines of code have executed. However, this information is insufficient in a large number of testing scenarios where the tester does not necessarily know the original purpose of each line of code and/or the exact conditions under which the lines of code were originally intended to execute. For example, the tester may not know whether the non-execution of certain lines of code is expected under nominal runtime conditions.

The herein disclosed technology provides a tool that allows programmers to easily and objectively define code branches which consist of groups of one or more lines of code; measure and track when those code branches execute; measure how and when each code branch is supposed to execute; and easily determine whether the code branches are executing as intended. In addition, these definitions setting forth the purpose of each code branch and when and how each branches should execute are encoded in such a way that the information is automatically and accurately communicated to a tester because the definitions are inside the programming code itself rather than within a test-plan document which can easily become out of sync or obsolete when the software is changed or fixed over time. According to one implementation, the foregoing is achieved via a code branch tracking module that provides an API via custom handlers that allows a developer to annotate each and every code branch in the software product (e.g., a driver, application, etc.) with information that the branch tracking module uses to evaluate the efficacy and operational integrity of the code branch as it executes. As used herein, a code branch refers to a section of code that conditionally executes to perform a functional part of an algorithm. The code branch encompasses all lines of code inside of a sub-routine (or function) or any conditional expression, branch, or construct that are executed when a particular programmer-specified Boolean condition is met (e.g., "if/else if/else" statements, "switch/case" branches, loops that can conditionally execute, and code that is expected to never execute). A code branch is, for example, logic that serves to add to the solution that the software product (driver, application, etc.)

exposes. "Code branch" is defined herein to explicitly exclude code sections that serve the exclusive purpose of tracking error conditions.

According to one implementation, the disclosed technology allows a programmer to embed an annotation within each branch of code in a code body. Each embedded code branch annotation identifies a macro, referred to herein as a "pass evaluation macro." When called during execution of the code branch, the pass evaluation macro executes to evaluate a select pass condition for the code branch. This evaluation generates information that indicates whether the branch is operating "properly"—regardless of whether "proper operation" entails execution or non-execution of the code branch during a nominal run-time scenario.

According to one implementation, execution of the above-described code branch annotations generates information that is dynamically tracked and managed by a code branch tracking module. Among other information, the code branch tracking module maintains a pass indicator status for each of the code branches. The pass indicator status indicates, based on a current execution count for each code branch, whether or not the associated pass condition is satisfied. When this tracked information is presented to a tester (user who is testing the software), the information may allow the user to quickly and easily understand whether each code branch has executed in accord with the developer's original intent regardless of whether that original intent is served via non-execution (e.g., the code branch does not execute in a nominal execution scenario) or via execution (e.g., wherein the code branch executes its logic to fulfill the functional operation for which the code branch was originally drafted).

The above-described information that is generated via execution of branch annotations and tracked by a code branch tracking module effectively improves the ability of a code tester to quickly and efficiently identify code branches that are not executing properly, allowing for expeditious reparation of both hard-to-detect coding errors and inefficiencies that may otherwise go undetected for an extended period of time. Code that is produced and released using the herein disclosed code branch tracking system is therefore more likely to run more efficiently (e.g., quicker) and in an error-free manner than code that is produced and released using traditional techniques. From the perspective of the end user (e.g., a user interacting with a released computer application), this translates to an improvement in the functioning of the computer wherein the user experiences a more streamlined interaction with the application and is less likely to experience the frustration of various crash scenarios, such as those causing systems hang-ups and irreparable corruption of user data.

Figure 1:
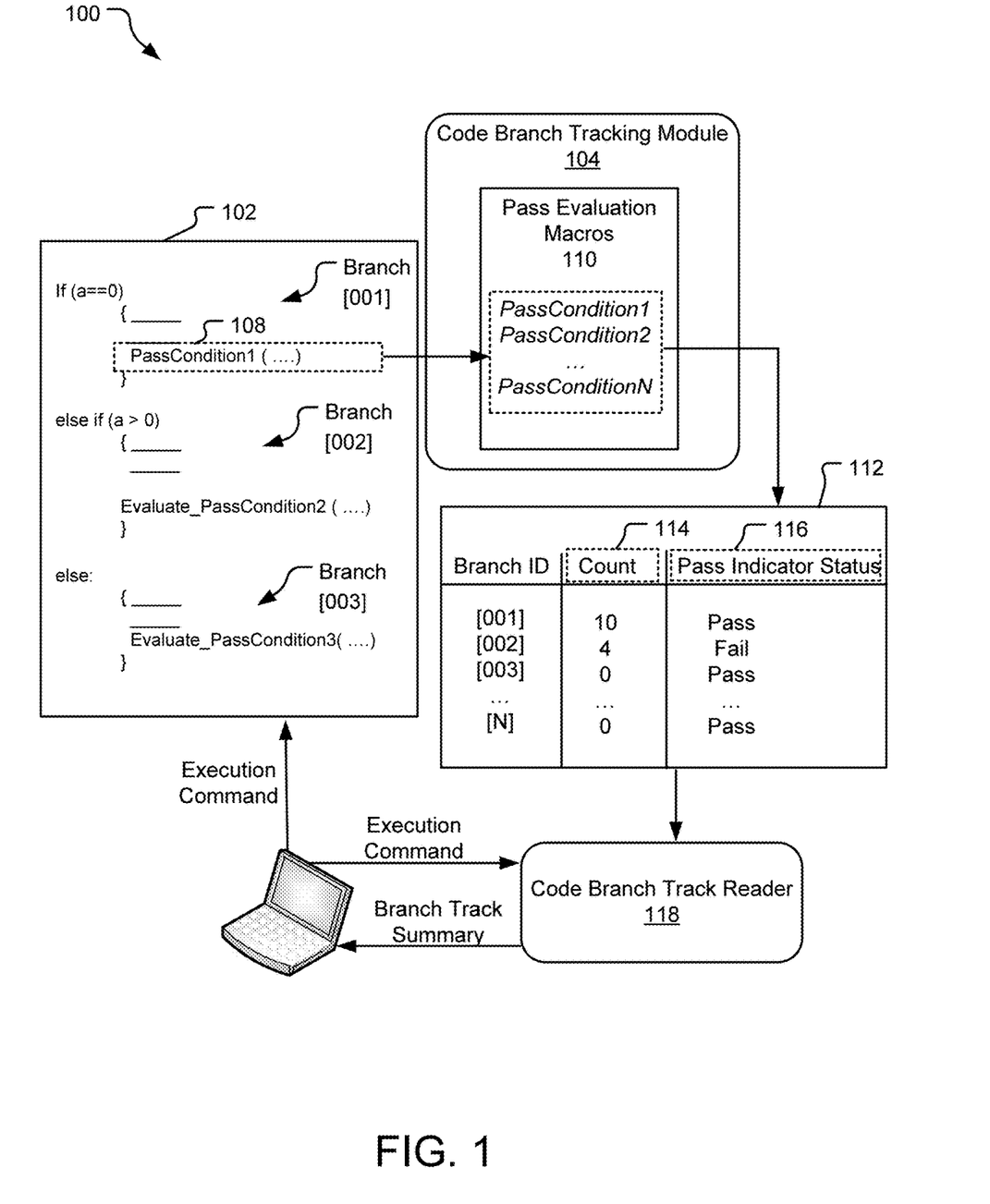
FIG. 1 illustrates an example system that utilizes code branch annotations and various modules to objectively verify proper execution of each code branch in a code body.

FIG. 1 illustrates an example system 100 that utilizes code branch annotations and a code branch tracking module 104 to objectively verify whether each code branch in a code body 102 executes in accord with original intent of a developer that drafted the code branch. As used herein, "original intent" refers to the initial purpose that a code branch is drafted to serve. This initial purpose may be understood as including both an intended trigger condition (e.g., the condition that causes the branch to execute) as well as an intended functional effect achieved via execution of the code branch.

In different implementations, the code body 102 may take on a variety of different forms including without limitation that of a system driver, user application, operating system, etc. By example and without limitation, the code body 102 is shown to include three code branches (branch [001], branch [002], and [003]). Each branch is proceeded by a conditional (e.g., if/else if/else). Although not shown, it is presumed that each of these three code branches includes code that adds to the functional solution provided by the code body 102. In the event that the code body 102 is a driver, each branch furthers the solution exposed by the driver.

Each of the code branches [001], [002], and [003] in the code body 102 includes an annotation (e.g., a code branch annotation 108). As the code branches execute, the annotations contained in the code branches also execute, causing the code branch tracking module 104 to accumulate information, such as the exemplary information shown in the branch track table 112 of FIG. 1. The code branch tracking module 104 includes various pass evaluation macros 110 that may be understood as functions selectively invoked by the code branch annotations (e.g., the annotation 108) to evaluate whether each code branch has executed in accord with the developer's original intent.

Although the code branch annotations (e.g., 108) may be added to the code at various points in time, it is presumed that—in at a least one implementation—the annotations are added by the developer at the time the code by is initially drafted. According to one implementation, each code branch annotation 108 identifies a select one of the pass evaluation macros 110 that is executable to evaluate a particular developer-selected "pass condition" for the associated code branch. Each pass condition may be understood as a set of objective, verifiable, developer-specified criteria that serves as a metric to ensure that the code branch has executed in a manner consistent with the developer's original intent.

In one implementation, one or more of the pass evaluation macros 110 assesses whether or not a pass condition is satisfied for a code branch by comparing an execution count for the code branch (e.g., number of times the code branch has executed) to a set execution count that the developer specified as sufficient to reasonably assume the code is working properly. For example, one of the pass evaluation macros 110 may evaluate a pass condition "Never Executes" that is satisfied so long as the associated code branch never executes. Another example one of the pass evaluation macros 110 may evaluate a pass condition "Executes Once" that is satisfied so long as the code branch has executed exactly once. Another example one of the pass evaluation macros 110 evaluates a pass condition "Executes Less Than" that is satisfied when the code branch has executed less than a threshold number of times, where the threshold is specified by the developer. In this and other scenarios (e.g., "executes more than" or "executes at least"), a threshold count value for the pass condition may be indicated in the annotation 108. Further exemplary pass evaluation macros 110 for the code branch tracking module 104 are defined below with respect to FIG. 2.

As each code branch executes within the code body 102, the embedded annotation executes to determine whether or not the pass condition indicated by the annotation is satisfied by the execution count of the associated code branch. Throughout this process, the code branch tracking module 104 logs certain information such as the exemplary information shown in the branch track table 112.

In FIG. 1, the branch track table 112 includes a branch ID for each branch in the code body 102 that has been annotated as described above. Throughout execution of the code body 102, the code branch tracking module 104 maintains and dynamically updates an execution count value 114 for each of the annotated code branches. The execution count value 114 indicates a number of times that the associated code branch has executed during the current run-time scenario. In addition, the code branch tracking module 104 also maintains and dynamically updates a pass indicator status 116 in association with each of the annotated code branches.

In general, the pass indicator status 116 represents a pass/fail status of the pass condition evaluated by the select one of the pass evaluation macros that is called by the annotation in the associated code branch. For example, the code branch [001] may be verified by a pass evaluation macro that evaluates the pass condition "executes at least five times." This exemplary pass condition is satisfied when the associated branch has executed at least five times. Since the exemplary data in the branch track table 112 indicates that the branch [001] has executed 10 times, the pass indicator status 116 indicates a "pass" value. Continuing the above example, the branch [002] may be verified by a pass evaluation macro that evaluates the pass condition "executes exactly once." Since the branch [002] has executed four times in this example, the pass indicator status 116 indicates a "fail" value.

Notably, the pass condition for some code branches may be satisfied when the code branch has not executed at all. For example, the branch track table 112 indicates that code branch [003] has a "pass" for the pass indicator status 116 even though it has executed zero times. This may be the case if, for example, the code branch [003] is intended to perform some aspect of error-handling during an anomalous runtime scenario. To ensure adequate assessment of branches for which the norm is non-execution (such as the branch [003]), the system 100 may be configured to initially determine and populate the pass indicator status 116 for each branch at compilation time, before the code body 102 begins to execute. For example, a compiler (not shown) of the code branch tracking module 104 may, at compilation time, analyze the annotations in the code body 102 and determine whether the associated pass conditions are satisfied by a "zero" execution count value. If so, the associated pass indicator status 116 may be initially populated with a "pass" value rather than a "fail." Although the pass indicator status 116 of each code branch is subject to change throughout execution of the code body 102, this initial population of the pass indicator status 116 at compilation time allows a tester to determine whether it is normal that the branch did not execute—a key technical advantage over existing code coverage solutions.

Figure 2:
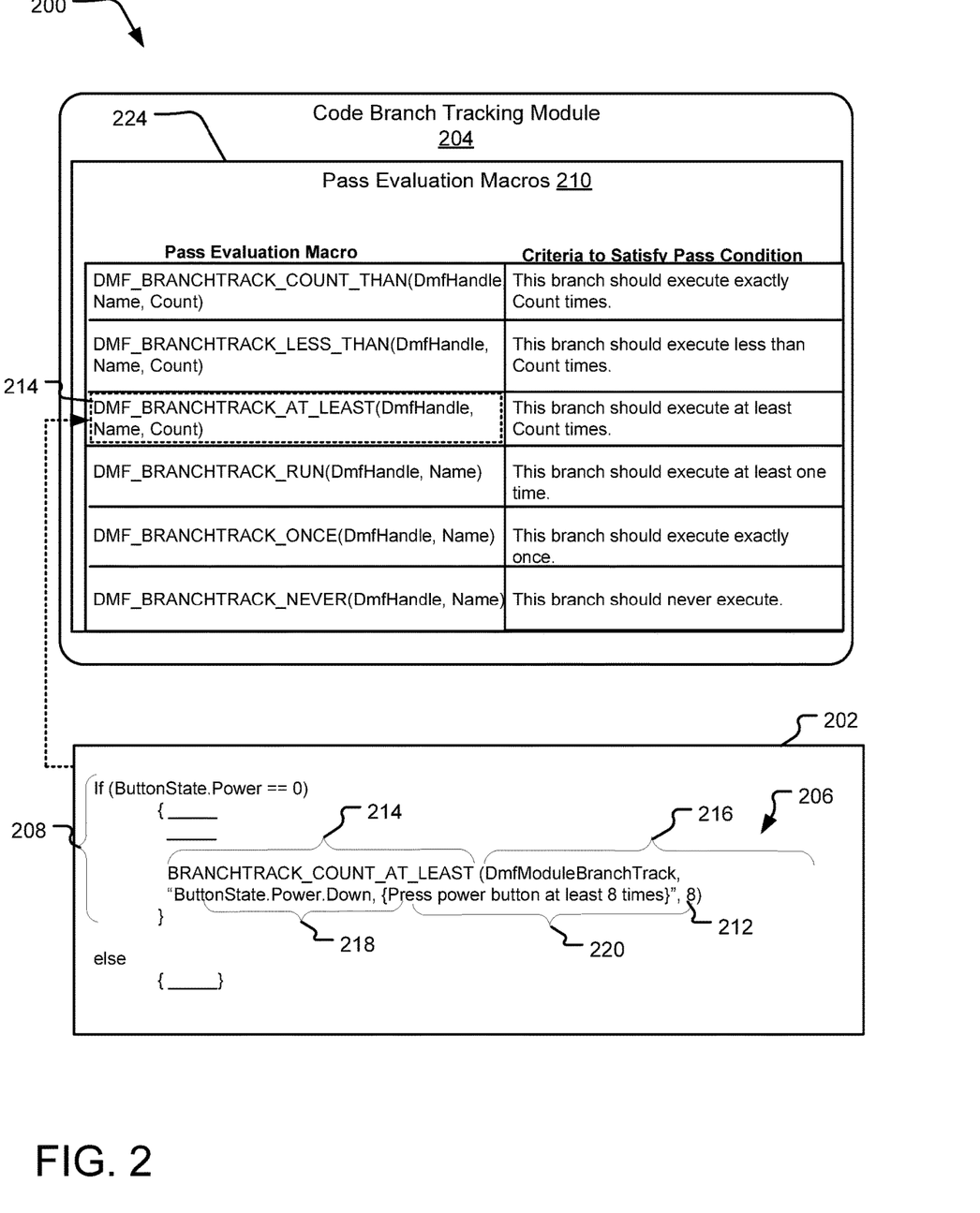
FIG. 2 illustrates aspects of another example system that utilizes code branch annotations to objectively verify proper execution of each code branch in a code body.

By example and without limitation, the code branch annotation 206 is also shown to designate a handle 216 (e.g., "DmfModuleBranchTrack") to the instantiated code branch tracking module 204 (e.g., a DMF handle) for the branch. This handle 216 provides the connection to the code that tracks branches at runtime, and the developer may use this handle 216 to cause the code branch tracking module 204 to perform its accounting of the execution of the code branch based on the annotation.

In some implementations, the tester may command the code branch track reader 118 with different filter options to request rendering of different subsets of the information accumulated by the code branch tracking module. For example, the tester may wish to view information about only the code branches that have a "fail" value for the pass indicator status 116 or information pertaining to specific code branches of interest. In this manner, the tester is optionally presented with accumulated information that provides a complete picture of whether or not every code branch in the code body 102 executed in a manner consistent with the pass condition initially designated by the developer that drafted the annotation.

As described further with respect to FIG. 2, the annotations within each code branch may include other information that allows the tester to also understand the conditions under which each code branch was intended to execute. This allows the tester to manually perform actions that force the code branch to execute during testing to allow the branch to satisfy the pass condition if the code branch does not, on its own, execute in a manner that satisfies the pass condition that the developer has assigned to the code branch.

FIG. 2 illustrates aspects of another system 200 that utilizes code branch annotations to objectively verify whether each branch in a code body 202 is executing in accord with a developer's original intent. Once instantiated in a test environment, a code branch tracking module 204 provides an API that allows a programmer to annotate each and every code branch in a code body (e.g., a driver) with certain information. Like the code branch tracking module 104 of FIG. 1, the code branch tracking module 204 includes pass evaluation macros 210 that may be invoked via execution of annotations included within code branches of the code body 202. Although the code branch tracking module 204 may be designed for execution in a variety of ways across different computing platforms for testing different types of code, the code branch tracking module 204 is by example and without limitation shown to be a "DMF module," which is a module created using the Driver Module FrameWork for developers making Windows drivers. In this example, the code body 202 is a client driver.

In FIG. 2, the code body 202 is shown to include a code branch 208 that includes a code branch annotation 206. When the code branch 208 is executed, the code branch annotation 206 executes a pass evaluation macro 214 that is included in the code branch. By example and without limitation, FIG. 2 illustrates a table 224 that illustrates various pass evaluation macros in addition to a description of the criteria needed to satisfy the associated pass condition. In the illustrated example, the code branch annotation 206 includes the pass evaluation macro 214 named "branchtrack_count_at_least", which is one of multiple pass evaluation macros 210 that is exposed by the code branch tracking module 204. The pass evaluation macro 214 evaluates a pass condition that is satisfied when the code branch 204 has executed at least "Count" times. In the illustrated example, the "Count" is a threshold execution count value 212 that the developer includes within the code branch annotation 206 (e.g., the value 8). This value is, for example, a value that the developer deemed sufficient to indicate, with reasonable certainty, that the code branch is working properly.

By example and without limitation, the code branch annotation 206 is also shown to designate a handle (e.g., "DmfModuleBranchTrack") to the instantiated code branch tracking module 204 (e.g., a DMF handle) for the branch. This handle provides the connection to the code that tracks branches at runtime, and the developer may use this handle to cause the code branch tracking module 204 to perform its accounting of the execution of the code branch based on the annotation.

The code branch annotation 206 also includes a name 218 of the code branch in which the code branch annotation 206 is embedded. For example, the name 218 may be a human-readable name of the code branch that allows the code branch to be uniquely identified. In some cases, the name 218 may be the name of a function in which the code branch exists along with a condition that causes the code branch to execute. For example, the name 218 ("ButtonState.Power. Down") may be used when the code branch is embedded within a function pertaining to power button controls and when the associated code branch is intended to be invoked when the physical state of the power button is "down." If later retrieved and presented to a tester in association with pass status indicator data (e.g., as described with respect to FIG. 1), the name 218 provides the tester with an understanding of the conditions that the developer intended to trigger execution of the code branch.

The code branch annotations may, in some implementations, also include human readable text that explains how to satisfy the pass condition that the developer selected for the code branch. For example, the code branch annotation 206 is shown to include human-readable text 220. In the illustrated example, this text informs the tester that the code branch has a pass condition that is satisfied when the power button is pressed at least 8 times (triggering 8 executions of the branch).

Effectively, the human-readable text 220 provides the tester with the means to perform actions to satisfactorily test the code branch until the branch's associated pass condition is satisfied. For example, during a driver test for the power button, information presented to the tester may indicate that the code branch 208 has a "fail" status for the pass indicator. This may imply either that the code branch 208 is not being invoked when it is supposed to be or simply that the tester has not yet performed the actions that the developer identified as sufficient to ensure that the code branch is working correctly. The human-readable text 220 (e.g., "press power button at least 8 times") tells the tester what is needed to satisfy the developer-defined pass condition. Consequently, the tester can—in this scenario—press the power button multiple additional times to try to change the code branch's status to "pass."

In some implementations, the code branch annotations may include other information in lieu of or in addition to the exemplary information shown in the code branch annotation 206. For example, some implementations may include annotations that include optional filters that allow the code branch 208 to be enabled or disabled for various execution modes. Other implementations provide for an optional condition that can cause the code branch 208 to be turned on or off automatically based on the run-time environment. Other aspects of the system 200 not explicitly described above may be the same or similar to those described with respect to FIG. 1.

Figure 3:
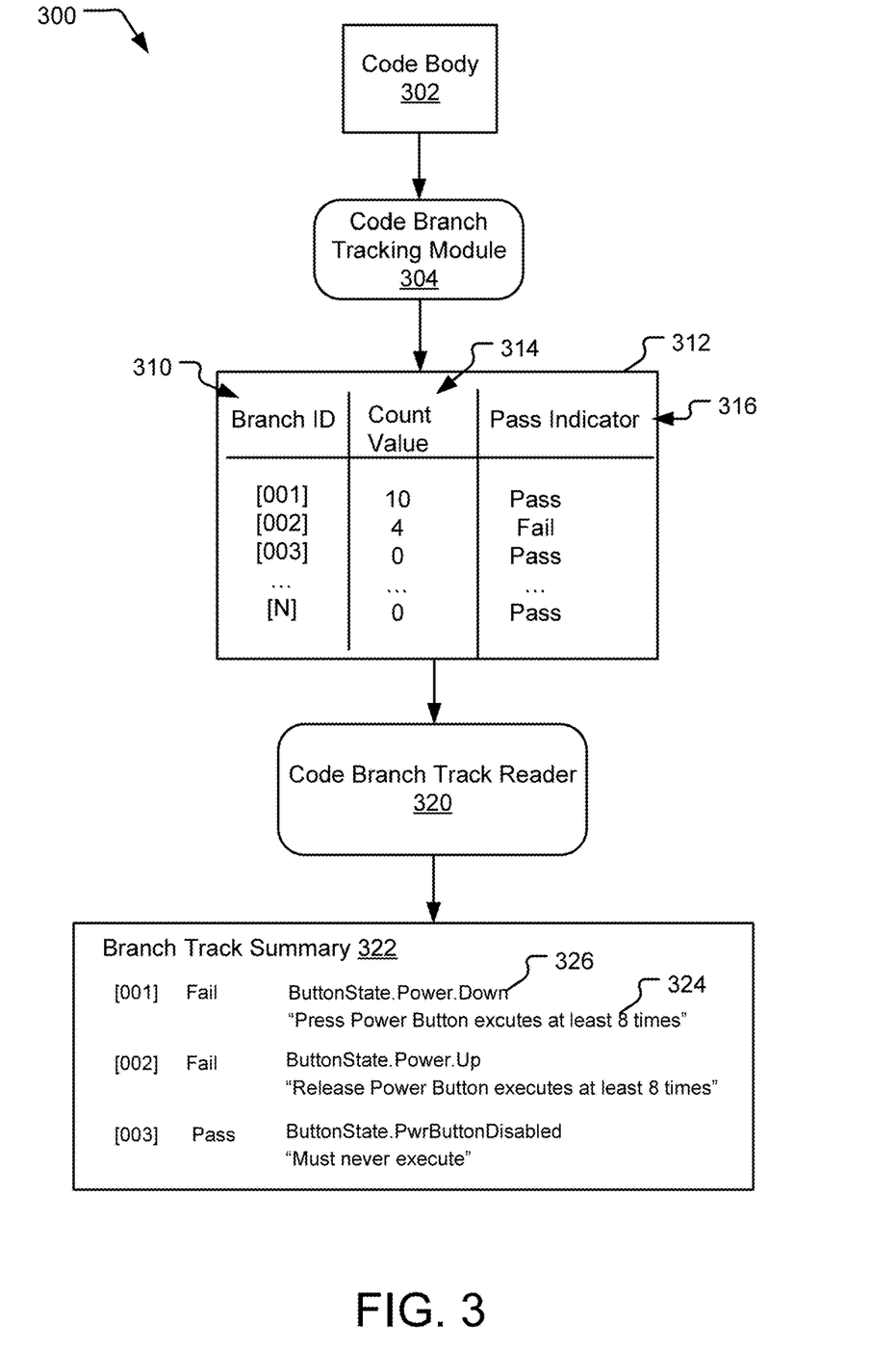
FIG. 3 illustrates aspects of yet still another example system that utilizes code branch annotations to objectively verify proper execution of each code branch in a code body.

FIG. 3 illustrates aspects of yet another system 300 that utilizes code branch annotations to objectively verify proper execution of each code branch in a code body 302. In one implementation, the code body 302 includes multiple code branches that have each been annotated by a developer with information the same or similar to that described with respect to the code branch annotations 206 of FIGS. 2 and/or 108 of FIG. 1.

Prior to execution of the code body 302, a branch track table 312 is initialized. In the example of FIG. 3, a code branch track module 304 initially populates the branch track table 312 with various information, that includes at least a branch ID 310. The branch ID 310 may, for example, include a numerical identifier for each code branch and/or a unique branch name indicating the function including the branch and condition(s) intended to trigger execution of the branch (e.g., such as the name 218 shown in FIG. 2). Additionally, the branch track table 312 is initialized to include a field (count value 314) that tracks the number of times each branch executes within a same run-time environment. Initially, all count values are initialized with starting values of zero to reflect that no branch has yet executed when the table is created. The branch track table 312 also includes a pass indicator 316 in association with each code branch. In one implementation, the pass indicator 316 is a "pass" or "fail" value that represents satisfaction or non-satisfaction of a pass condition identified by the annotation of the associated code branch. For example, the pass condition is defined by the select pass evaluation macro alone or in combination with one or more evaluation thresholds specified in the annotation. In some implementations, the code branch annotations may also include the pass condition in human-readable text form.

When initially populating the code branch tracking table 312, the code branch tracking module 304 reads the annotations within each code branch and determines whether the defined pass conditions for each code branch are satisfied by the initialized (zero) count value. For example, a code branch that is intended to never execute during nominal events may have a pass condition satisfied by the initial "zero" count value. For these branches, the code branch tracking module 304 sets the initial pass indicator to "pass" and sets the initial pass indicator to "fail" for all others.

After the branch track table 312 is instantiated and initialized with starting values as described above, the tester (a tester) may initiate execution of the code body. When the code body 302 is executed during run-time, the annotations execute as they are encountered. According to one implementation, execution of each annotation entails executing inline code that has been generated by a compiler at compile-time based on the original annotation. Execution of this inline code updates the branch track table 312 maintained for the code body 302 using the code branch tracking module 304 to increment the count value for the code branch associated with the annotation. Additionally, execution of each annotation invokes a select pass evaluation macro that evaluates a corresponding pass condition. Satisfaction or non-satisfaction of the pass condition depends upon the count value 314 for the code branch that is maintained and dynamically updated within the branch track table 312 during execution of the code body 302.

When performing tests on the code body 302, such as when implementing changes for subsequent versions of the code, a tester may command a code branch track reader 320 to retrieve and render select information from the branch track table 312 to a display. For example, a branch track summary 322 is shown to indicate example types and formats of information that may be rendered to a display during or subsequent to execution of the code body 302. In the illustrated example, the branch track summary 322 includes branch ID information including a numerical ID (e.g., [001], [002], [003]) as well as a branch name 326 that indicates intended trigger conditions (e.g., when the developer intended the branch to execute). For example, the branch name "ButtonState.Power.Down" indicates that the developer intended the branch to execute responsive to a press of the power button. Likewise, the branch name "ButtonState.Power.up" indicates that the developer intended the branch to execute responsive to release of the power button. By further example, the name "ButtonState.PwrButtonDisabled" indicates that the developer intended the branch to execute when the system has disabled the power button.

In addition to the branch name 326, the branch track summary 322 includes human readable text 324 indicating how the associated pass condition is satisfied. For example, the human readable text 324 indicates that the branch "ButtonState.Power.Down" has a pass condition that is satisfied when the system detects 8 presses of the power button. Likewise, the human-readable text for the branch named "ButtonState.PwrButtonDisabled" indicates that the pass condition is satisfied provided that the branch has never executed. In one implementation, both the branch name 326 and human readable text 324 are specified within the annotation of the associated code branch.

The branch track summary 322 also indicates the current pass indicator status for each branch. In this example, the branch [001] has a "fail" value for the pass indicator because the branch has not yet executed enough times to satisfy the developer-defined pass condition. In this scenario, the branch track summary 322 immediately provides the tester with meaningful information that may be critical in helping the tester to ascertain information such as (1) comprehensive identification of code branches potentially experiencing problems (notably—the "fail" status may be triggered by either non-execution or excess execution that is contrary to a develop-specified pass condition); (2) set trigger condition(s) that the developer intended to trigger execution of each code branch; and (3) a metric (e.g., the pass condition in human-readable text) that the tester can use to troubleshoot whether the branch is indeed working in a manner consistent with the developer's original intent.

For example, a tester presented with the branch track summary 322 may attempt to change the "fail" pass indicator status of branches [001] and [002] to a "pass" by systematically pressing and releasing the power button 8 times. If the branch is working correctly, the tester can expect the status to switch from "fail" to "pass" after the eight press. Since this test was devised by the original developer of the code branch, the tester can be reasonably assured that that he has verified proper execution of all intended trigger paths for the branch. When using the above methodology to systematically test all code branches in the code body 302, the tester can be reasonably assured that every branch has been tested according to all intended trigger conditions of the original developer.

Figure 4:
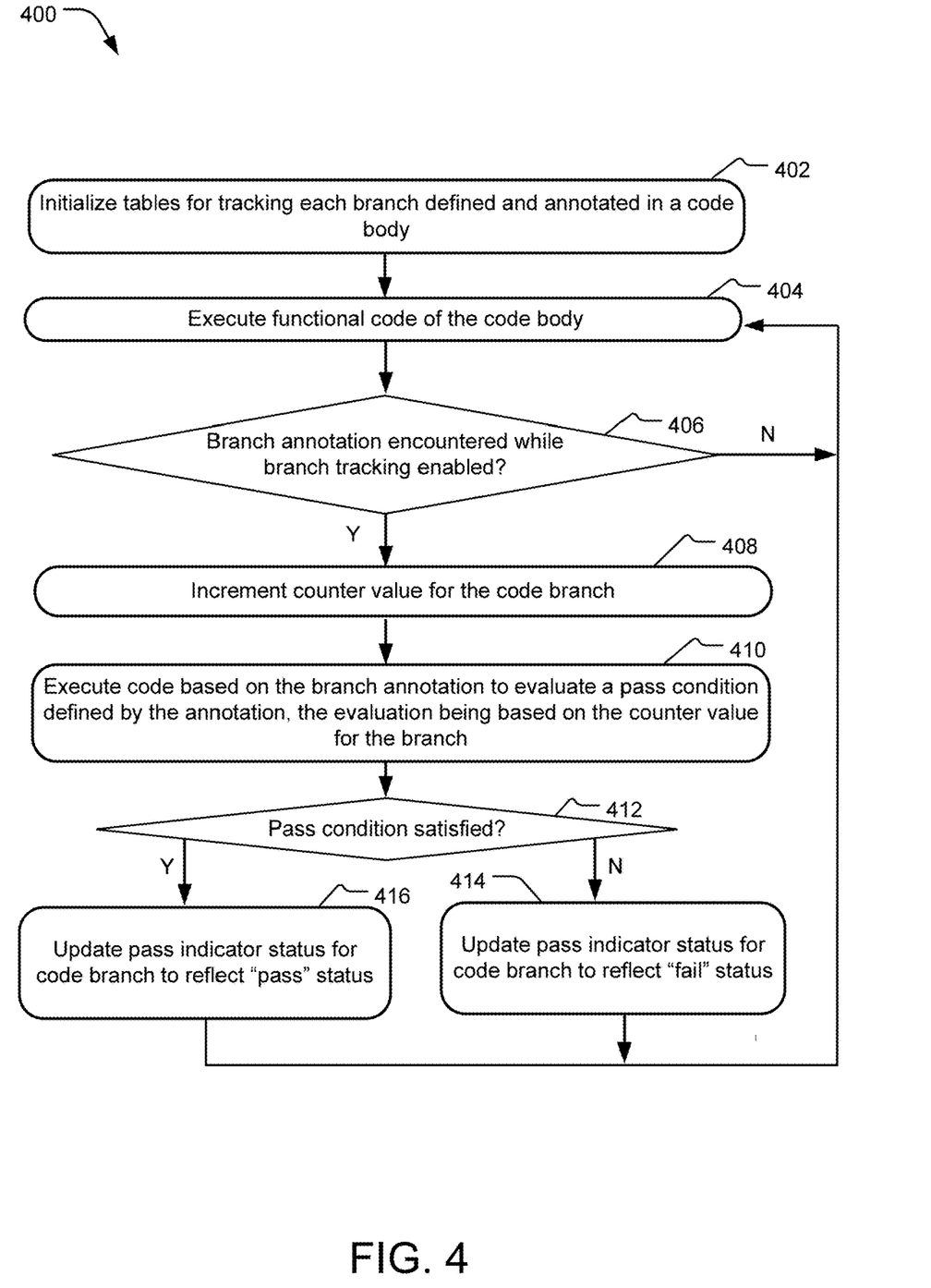
FIG. 4 illustrates example operations for using code branch annotations to objectively verify proper execution of each code branch in a code body

FIG. 4 illustrates example computer-implemented operations 400 for using code branch annotations to objectively verify proper execution of each code branch in a code body. Prior to the operations 400, a software author has written a body of code, defined branches in the code, and annotated each code branch to include an executable annotation operable to evaluate both when the branch should execute and if the branch has executed as intended. When the body of code is compiled, a compiler generates inline code based on the branch annotation for each branch that is to execute when the code branch executes. At program initialization time, an initialization operation 402 initializes branch tracking information for each of multiple annotated code branches in the code body. According to one implementation, the branch tracking information includes a branch ID field, a counter value indicating a number of times that the code branch has executed, and a pass indicator status indicating satisfaction or non-satisfaction of a pass condition identified by the annotation. The initialization operation 402 populates the branch ID field with a branch ID of each annotated branch in the code body and initializes the counter value for each branch to a zero value. During this phase, a code branch tracking module (e.g., 304 of FIG. 3) reads each annotation into a table and executes a pass evaluation macro identified within the annotation to assess whether or not the initial counter value (zero) for the code branch satisfies the pass condition provided by the annotation within the code branch. In cases where the "zero" counter value does satisfy the pass condition defined by the annotation, the initialization operation sets the pass indicator status to "pass."

Otherwise, the initialization operation 402 sets the pass indicator status for the code branch to "fail."

Subsequently, an execution operation 404 begins executing functional code of the code. As the code body is executed, a sequence of operations 406-416 (described below) may execute multiple times, once for each time one of the annotated code branches is executed. A determination operation 406 determines whether a branch tracking annotation is encountered while branch tracking is enabled. If not, the execution operation 404 continues executing functional code of the code body. When the determination operation 406 determines that an annotation has been encountered while branch tracking is enabled, a counter incrementation operation 408 increments a count value for the code branch and an execution operation 410 executes the annotation (e.g., thereby executing inline code generated during compilation of the code body) to both evaluate a pass condition and update the branch track table 312.

According to one implementation, the pass condition sets forth one or more rules used to determine whether or not the current execution of the code is consistent with the original intent of the code author. The annotation may, for example, include a function call to a particular pass evaluation macro, one or more thresholds for evaluating the pass condition, or (in some cases) include human-readable text of the annotation that explains the pass condition. Execution of the annotation invokes a pass evaluation macro that evaluates satisfaction the pass condition based on the current counter value for the code branch and/or other information, such as information included within the code branch.

A determination operation 412 determines whether the pass condition for the branch is satisfied by the current counter value for the branch. If the pass condition is not satisfied, a logging operation 414 checks the most recent pass indicator status for the branch and updates the pass indicator status to "fail" if not already set to "fail." If the pass condition is satisfied, a logging operation 416 checks the most recent pass indicator status for the branch and updates the pass indicator status to "pass" if not already set to "pass." At any time during or subsequent to execution of the operations 400, a tester may command a reading operation to retrieve and render the branch tracking information to a display.

Figure 5:
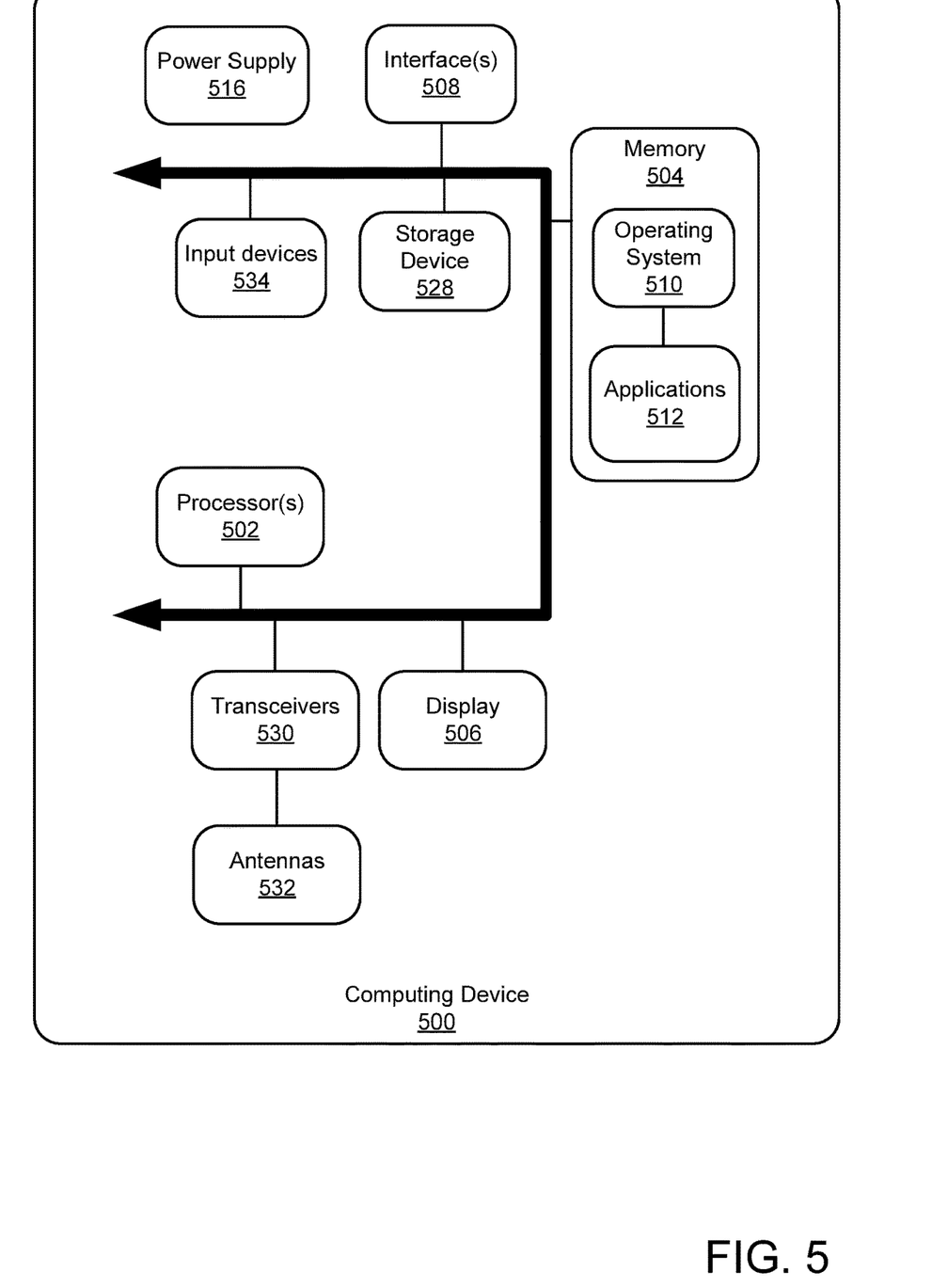
FIG. 5 illustrates an example schematic of a processing device that may be suitable for implementing aspects of the disclosed technology.

FIG. 5 illustrates an example schematic of a processing device 500 that may be suitable for implementing aspects of the disclosed technology. The processing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory 504 and is executed by the processor unit(s) 502, although it should be understood that other operating systems may be employed.

One or more applications 512 (e.g., such as the code body 102, code branch tracking module 104, and the code branch track reader 118 of FIG. 1) are loaded in the memory 504 and executed on the operating system 510 by the processor unit(s) 502.

Applications 512 may receive input from various input local devices 534 such as a microphone, keypad, mouse, stylus, touchpad, joystick, etc. Additionally, the applications 512 may receive input from one or more remote devices, such as remotely-located smart devices, by communicating with such devices over a wired or wireless network using more communication transceivers 530 and an antenna 532 to provide network connectivity (e.g., a mobile phone network, Wi-Fi®, Bluetooth®).

The processing device 500 further includes storage device 528 and a power supply 516, which is powered by one or more batteries (e.g., a battery 520) and/or other power sources and which provides power to other components of the processing device 500. The power supply 516 may also be connected to an external power source (not shown) that overrides or recharges the built-in batteries or other power sources.

In an example implementation, a code branch tracking module and/or code branch track reader includes hardware and/or software embodied by instructions stored in the memory 504 and/or storage devices 528 and processed by the processor unit(s) 502. The memory 504 may be the memory of a host device or of an accessory that couples to the host.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes a code branch tracking module stored in memory that maintains a counter value in association with each of multiple code branches defined within a code body during execution of the code body, and dynamically updates and maintains a pass indicator status for each of the code branches during execution of the code body. The counter value for each one of the code branches represents a number of times the code branch has executed within a current run-time environment and the pass indicator status indicates satisfaction or non-satisfaction of a pass condition identified within the code branch that is based on the associated counter value for the code branch.

In one example system according to any preceding system, the pass condition for each one of the code branches is identified within an annotation included within the code branch, the annotation referencing a pass evaluation macro that is executed to evaluate the pass condition upon execution of the code branch.

In yet another example system of any preceding system, the pass condition for a select branch of the code branches is satisfied by execution of the select branch and the pass indicator status for the select branch indicates a fail status when the code branch has not executed.

In yet another example system of any preceding system, the pass condition is a metric selected by a developer usable to verify that an associated code branch has executed in accord with an original intent of the developer.

In still yet another example system of any preceding system, the annotation of each of the multiple code branches identifies a condition for triggering execution of the code branch.

In yet still another example system of any preceding system, the code branch tracking module is further configured to: re-assess satisfaction of the pass condition for a select branch of the code branches responsive to incrementing the counter value for the select branch; and update the pass indicator status for the select branch based on the re-assessment.

Another example system of any preceding system further comprises a reader tool stored in memory that queries the code branch tracking module with a request for information pertaining to execution of the code body, where the requested information includes the pass indicator status for one or more of the multiple code branches. The reader tool receives and presents the requested information on a display of a computing device.

In still another example system of any preceding system, the pass condition for each one of the code branches is evaluated by a pass evaluation macro identified in an annotation included within the code branch, the pass evaluation macro being executable to assess whether the count value for the code branch matches a developer-selected threshold count value.

An example method disclosed herein includes maintaining a counter value in association with each of multiple code branches defined within a code body during execution of the code body and dynamically updating and maintaining a pass indicator status for each of the code branches during execution of the code body. The counter value for each one of the code branches represents a number of times the code branch has executed within a current run-time environment, and the pass indicator status indicates satisfaction or non-satisfaction of a pass condition identified within the code branch that is based on the associated counter value for the code branch.

In another example methods according to any preceding method, the pass condition for each one of the code branches is identified within an annotation included within the code branch. The annotation references a pass evaluation macro that is executed to evaluate the pass condition upon execution of the code branch. In still another example method of any preceding method, the annotation in at least one of the multiple code branches includes a developer-selected threshold count value used by the pass evaluation macro to evaluate the pass condition.

In yet still another example method of any preceding method, the pass condition identified by each code branch is a metric selected by a developer usable to verify that the code branch has executed in accord with an original intent of the developer.

In another example method of any preceding method, the annotation includes a branch name identifying a condition sufficient to trigger execution of the code branch.

In yet still another example method of any preceding method, the annotation includes human-readable text indicating the pass condition.

In still another example method of any preceding method, the method further comprises re-assessing satisfaction of the pass condition for a select branch of the code branches responsive to incrementing the counter value for the select code branch and updating the pass indicator status for the select code branch based on the re-assessment.

Still another example method of any preceding method further comprises requesting information pertaining to execution of the code body that includes the pass indicator status for one or more of the multiple code branches, and presenting the requested information on a display of a computing device.

In yet still another example method of any preceding method, the pass condition for each one of the code branches is evaluated by a pass evaluation macro identified in an annotation included within the code branch. The pass evaluation macro is executable to assess whether the count value for the code branch matches a developer-selected threshold count value.

Another example system disclosed herein includes a code body stored in memory and including a code branch having an annotation that identifies a pass condition usable to verify whether execution of the code branch is consistent with original intent of a developer that drafted the code branch. The annotation is executable to evaluate satisfaction of the pass condition based a determined number of times that the code branch has executed within a current run-time environment prior the evaluation.

In yet another example system of any preceding system, the system further comprises a code branch tracking module stored in memory that dynamically updates and maintains a pass indicator status for each of the code branches during execution of the code body. The pass indicator status indicates satisfaction or non-satisfaction of the pass condition identified by the annotation of each code branch.

Yet still another example system of any preceding system further comprises a reader tool stored in memory that queries the code branch tracking module with a request for information pertaining to execution of the code body, the requested information including the pass indicator status for the code branch and presents the requested information on a display of a computing device.

Yet still another example system disclosed herein includes a means for maintaining a counter value in association with each of multiple code branches defined within a code body during execution of the code body and a means for dynamically updating and maintaining a pass indicator status for each of the code branches during execution of the code body. The counter value for each one of the code branches represents a number of times the code branch has executed within a current run-time environment, and the pass indicator status indicates satisfaction or non-satisfaction of a pass condition identified within the code branch that is based on the associated counter value for the code branch.

In another example memory device of any preceding memory device, the memory space is a continuous sequence of sequential physical blocks. The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A system comprising:
a code branch tracking module stored in memory that:
maintains a counter value in association with each of multiple code branches defined within a code body during execution of the code body, the counter value for each one of the code branches representing a number of times the code branch has executed within a current run-time environment; and
dynamically updates and maintains a pass indicator status for each of the code branches during execution of the code body responsive to execution of an annotation included in the code branch, the pass indicator status indicating satisfaction or non-satisfaction of a pass condition identified within the code branch that is based on the associated counter value for the code branch, the annotation within each of the code branches identifying:
a pass evaluation macro; and
a threshold value for the code branch that is provided as an input to the pass evaluation macro of the code branch, wherein at least two code branches have threshold values different from each other, the pass evaluation macro being executed upon execution of the code branch to evaluate the pass condition based on a comparison between the threshold value and the counter value.

2. The system of claim 1, wherein the pass condition for a select branch of the code branches is satisfied by execution of the select branch and the pass indicator status for the select branch indicates a fail status when the code branch has not executed.

3. The system of claim 1, wherein the pass condition is a metric selected by a developer usable to verify that an associated code branch has executed in accord with an original intent of the developer.

4. The system of claim 1, wherein the annotation of each of the multiple code branches identifies a condition for triggering execution of the code branch.

5. The system of claim 1, wherein the code branch tracking module is further configured to:
re-assess satisfaction of the pass condition for a select branch of the code branches responsive to incrementing the counter value for the select branch; and
update the pass indicator status for the select branch based on the re-assessment.

6. The system of claim 1, further comprising:
a reader tool stored in memory that:
queries the code branch tracking module with a request for information pertaining to execution of the code body, the requested information including the pass indicator status for one or more of the multiple code branches; and
presents the requested information on a display of a computing device.

7. The system of claim 1, wherein the pass evaluation macro is executable to assess whether the count value for the code branch matches a developer-selected threshold count value.

8. A method comprising:
maintaining a counter value in association with each of multiple code branches defined within a code body during execution of the code body, the counter value for each ones of the code branches representing a number of times the code branch has executed within a current run-time environment; and
dynamically updating and maintaining a pass indicator status for each of the code branches during execution of the code body responsive to execution of an annotation included in the code branch, the pass indicator status indicating satisfaction or non-satisfaction of a pass condition identified within the code branch that is based on the associated counter value for the code branch, the annotation within each of the code branches identifying:
a pass evaluation macro; and
a threshold value for the code branch that is provided as an input to the pass evaluation macro of the code branch, wherein a code branch developer is able to assign different threshold values for each of the multiple code branches, the pass evaluation macro being executed upon execution of the code branch to evaluate the pass condition based on a comparison between the threshold value and the counter value.

9. The method of claim 8, wherein the pass condition identified by each code branch is a metric selected by a developer usable to verify that the code branch has executed in accord with an original intent of the developer.

10. The method of claim 8, wherein the annotation includes a branch name identifying a condition sufficient to trigger execution of the code branch.

11. The method of claim 8, wherein the annotation includes human-readable text indicating the pass condition.

12. The method of claim 8 further comprising:
re-assessing satisfaction of the pass condition for a select branch of the code branches responsive to incrementing the counter value for the select code branch; and
updating the pass indicator status for the select code branch based on the re-assessment.

13. The method of claim 8, further comprising:
requesting information pertaining to execution of the code body, the requested information including the pass indicator status for one or more of the multiple code branches; and
presenting the requested information on a display of a computing device.

14. The method of claim 8, wherein the pass evaluation macro is executable to assess whether the count value for the code branch matches a developer-selected threshold count value.

15. A system comprising:
a code body stored in memory and executable by a processor, the code body including a code branch having an annotation that identifies a pass condition usable to verify whether execution of the code branch is consistent with original intent of a developer that drafted the code branch, the annotation including:
a pass evaluation macro; and
a threshold value for the code branch that is provided as an input to the pass evaluation macro of the code branch, wherein the threshold value for one or more of the multiple code branches is selected by a developer to be different from each other and to ascertain that the one or more code branches are working properly, the pass evaluation macro being executed upon execution of the code branch to evaluate the pass condition based on a comparison between the threshold value and a determined number of times that the code branch has executed within a current run-time environment prior to the evaluation.

16. The system of claim 15, further comprising:
a code branch tracking module stored in memory that dynamically updates and maintains a pass indicator status for each of the code branches during execution of the code body, the pass indicator status indicating satisfaction or non-satisfaction of the pass condition identified by the annotation of each code branch.

17. The system of claim 16, further comprising:
a reader tool stored in memory that:
queries the code branch tracking module with a request for information pertaining to execution of the code body, the requested information including the pass indicator status for the code branch; and
presents the requested information on a display of a computing device.

* * * * *